United States Patent [19]
Barry et al.

[11] Patent Number: 5,134,954
[45] Date of Patent: Aug. 4, 1992

[54] ASYMMETRIC HYDROFOIL PROPULSION METHOD AND APPARATUS

[75] Inventors: Christopher D. Barry, San Francisco; Bryan Duffty, Gilroy, both of Calif.

[73] Assignee: FMC Corporation, Chicago, Ill.

[21] Appl. No.: 601,620

[22] Filed: Oct. 24, 1990

Related U.S. Application Data

[63] Continuation of Ser. No. 421,485, Oct. 13, 1989, abandoned.

[51] Int. Cl.5 .................................. B63B 1/24
[52] U.S. Cl. .......................... 114/274; 440/66; 114/280
[58] Field of Search .................. 114/274–282, 114/270; 440/66–70

[56] References Cited

U.S. PATENT DOCUMENTS

| | | | |
|---|---|---|---|
| 1,044,176 | 11/1912 | Hickman | 114/281 X |
| 3,027,862 | 4/1962 | Votre | 114/282 X |
| 3,092,062 | 6/1963 | Savitsky | 114/280 X |
| 3,183,871 | 5/1965 | Reder | 114/282 |
| 3,420,204 | 1/1969 | Samuel | 115/1 |
| 3,476,072 | 11/1969 | Wilson | 114/281 X |
| 4,798,547 | 1/1989 | Gearhart | 440/66 |

FOREIGN PATENT DOCUMENTS 0765117  9/1980  U.S.S.R. .................... 114/282

*Primary Examiner*—Ed Swinehart
*Attorney, Agent, or Firm*—A. J. Moore; R. C. Kamp; R. B. Megley

[57] ABSTRACT

An asymmetrically arranged hydrofoil and propeller system is disclosed for improving the speed and lift of watercraft such as amphibious vehicles. When the vehicle is propelled through water by propellers, a downwash of water from the upper surface of the asymmetrically arranged hydrofoils is intercepted by upwardly moving propeller blades which improve the speed, lift and efficiency of the watercraft.

3 Claims, 5 Drawing Sheets

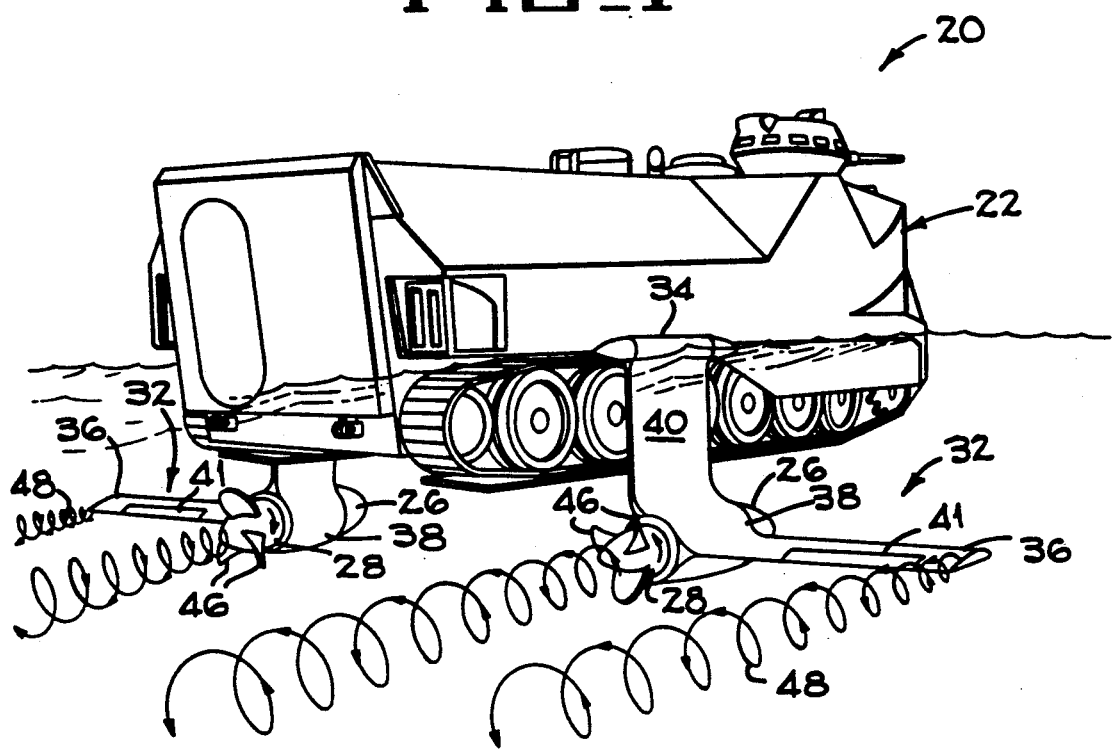
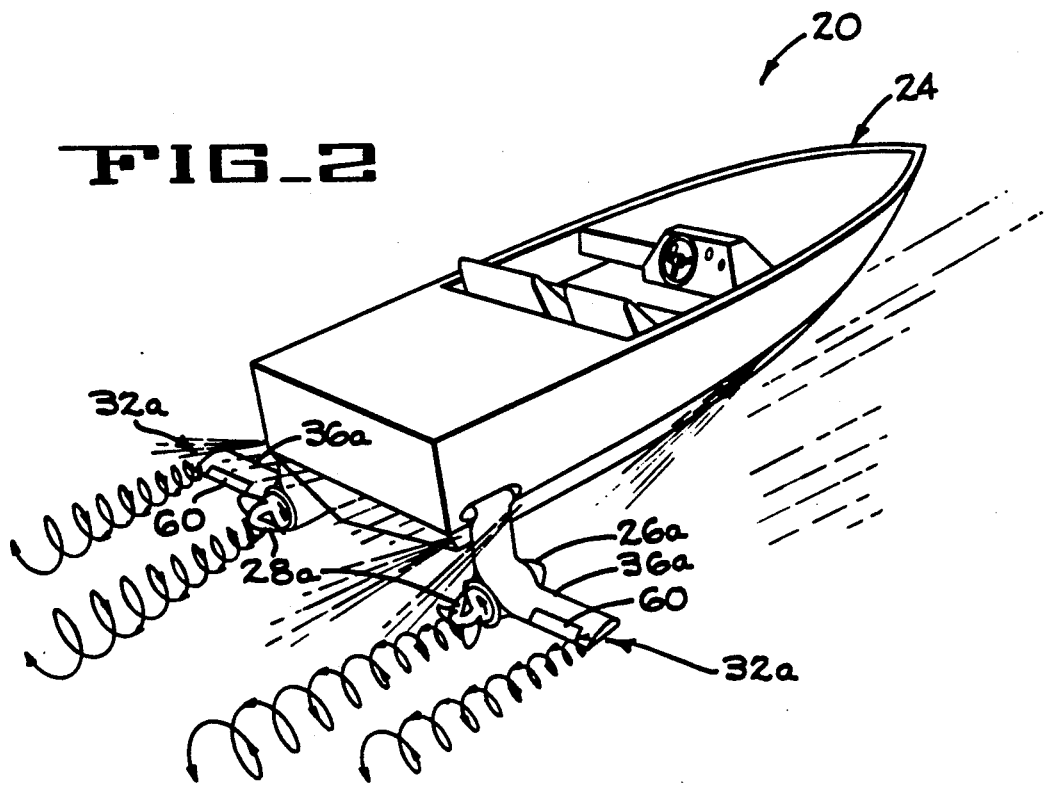

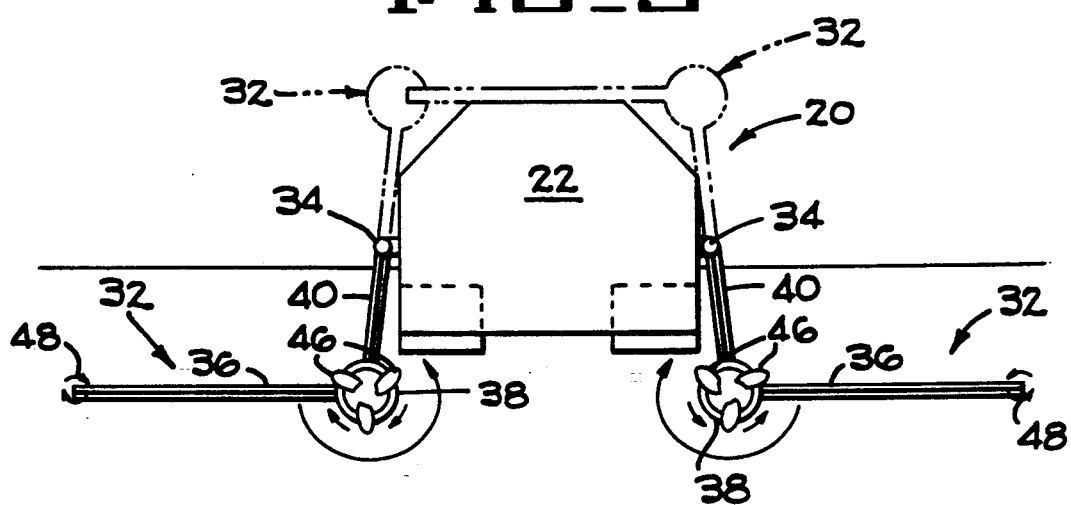
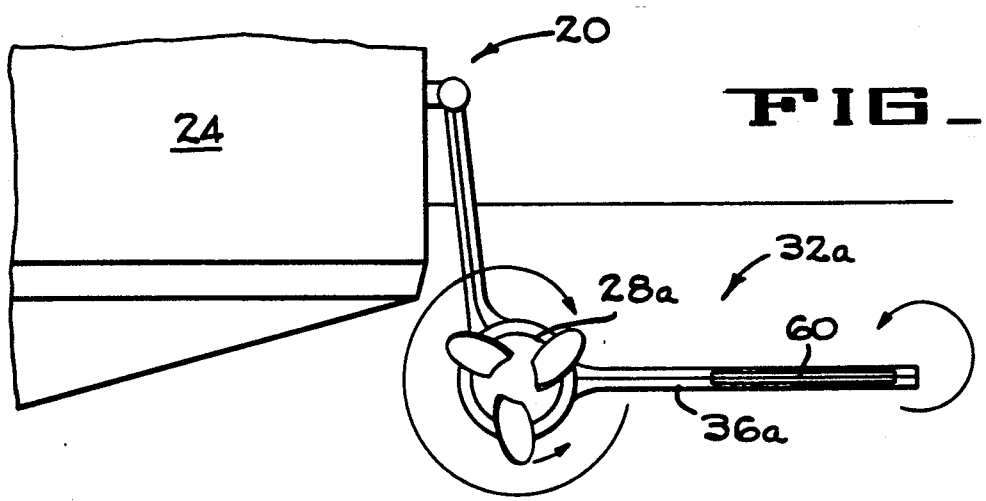
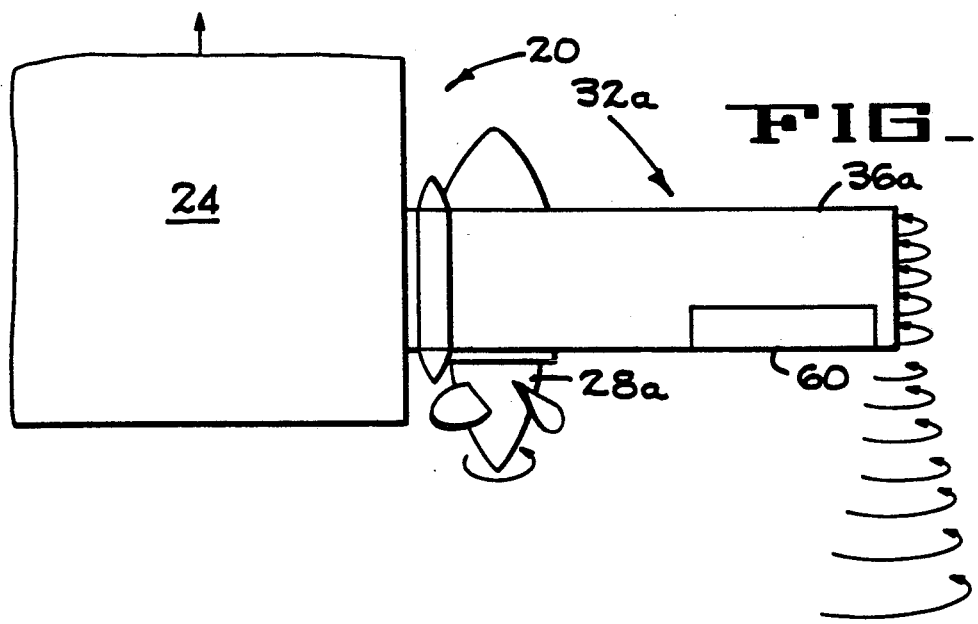

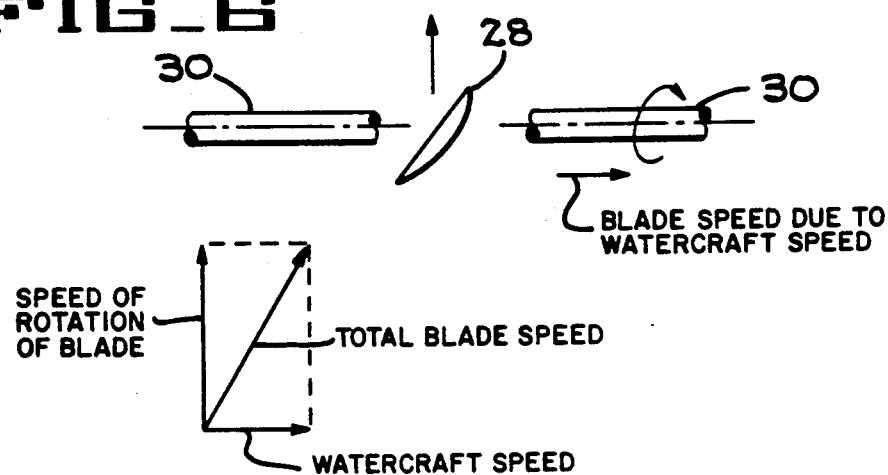
FIG_6
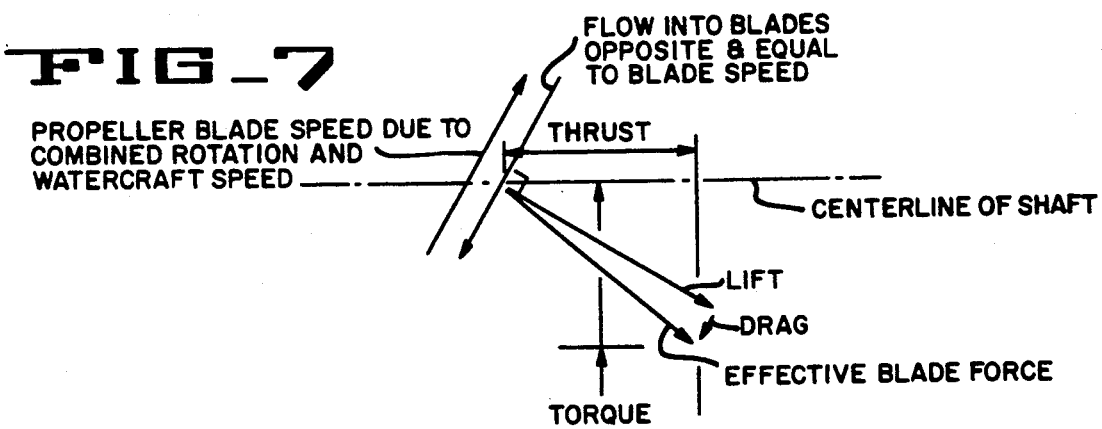
FIG_7
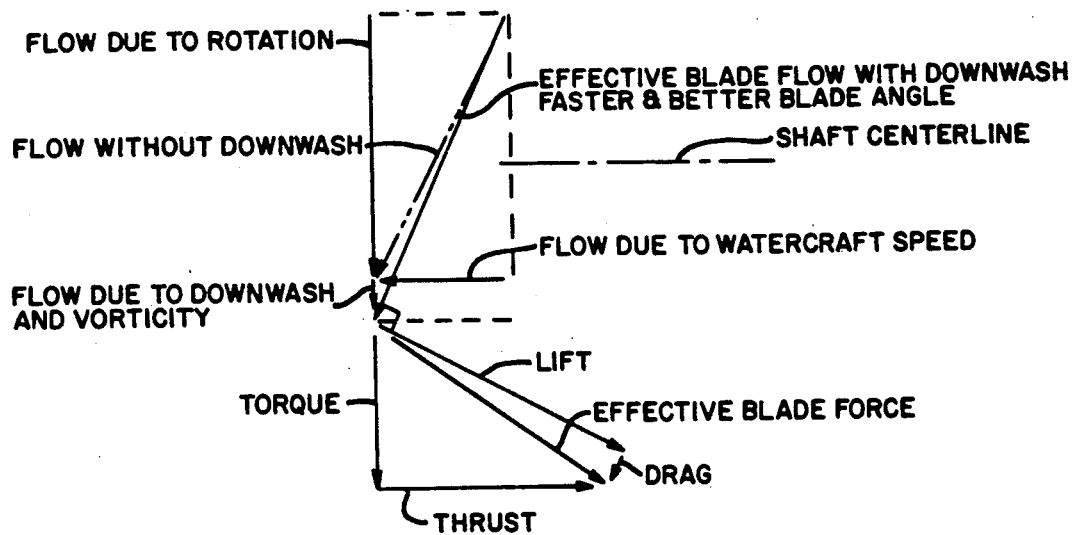
FIG_8

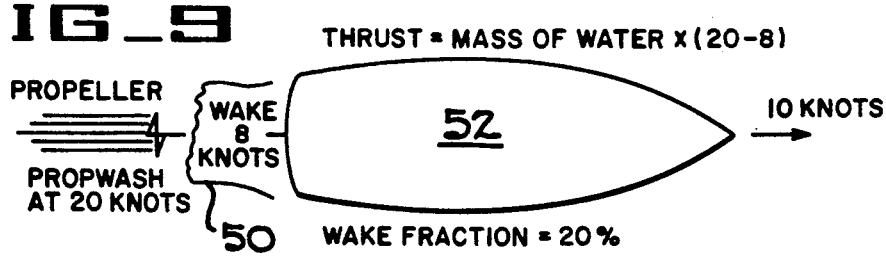
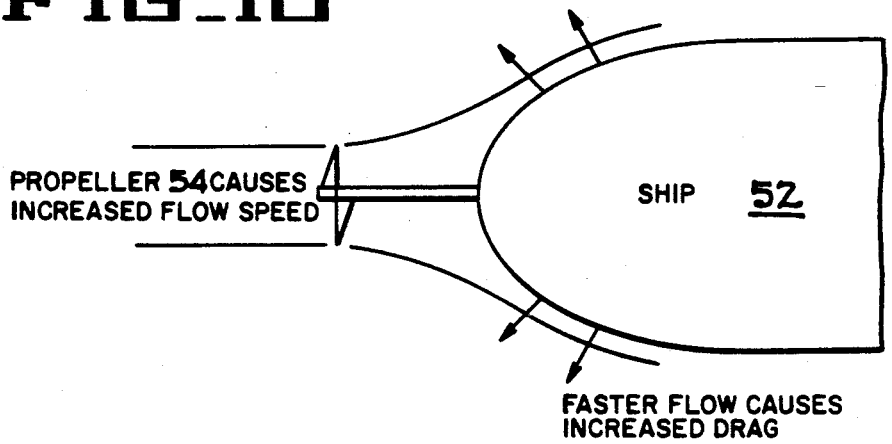
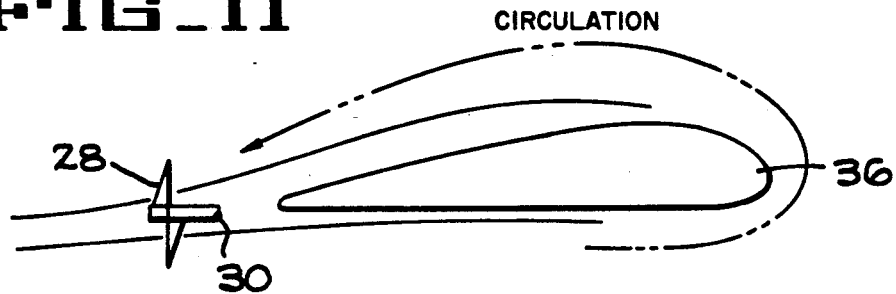
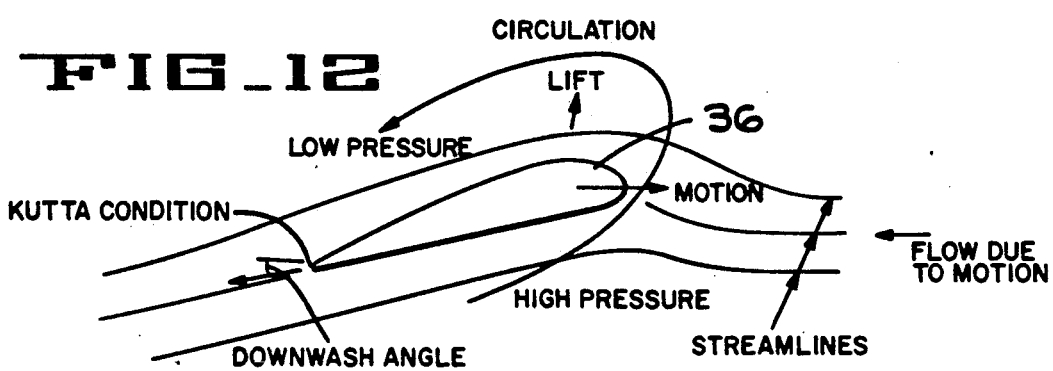

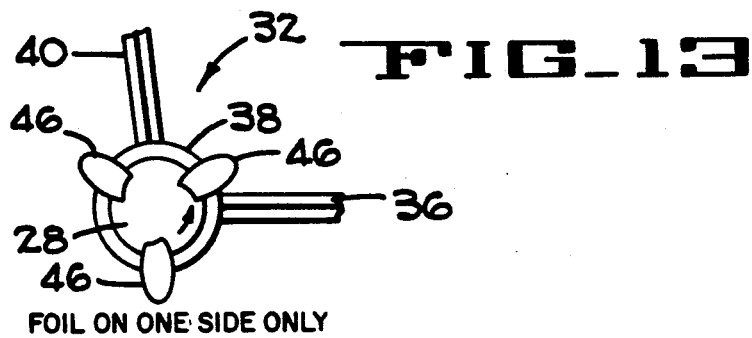
FIG_13 — FOIL ON ONE SIDE ONLY
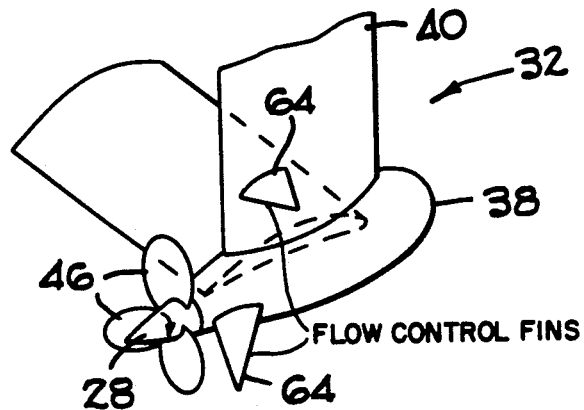
FIG_14 — FLOW CONTROL FINS
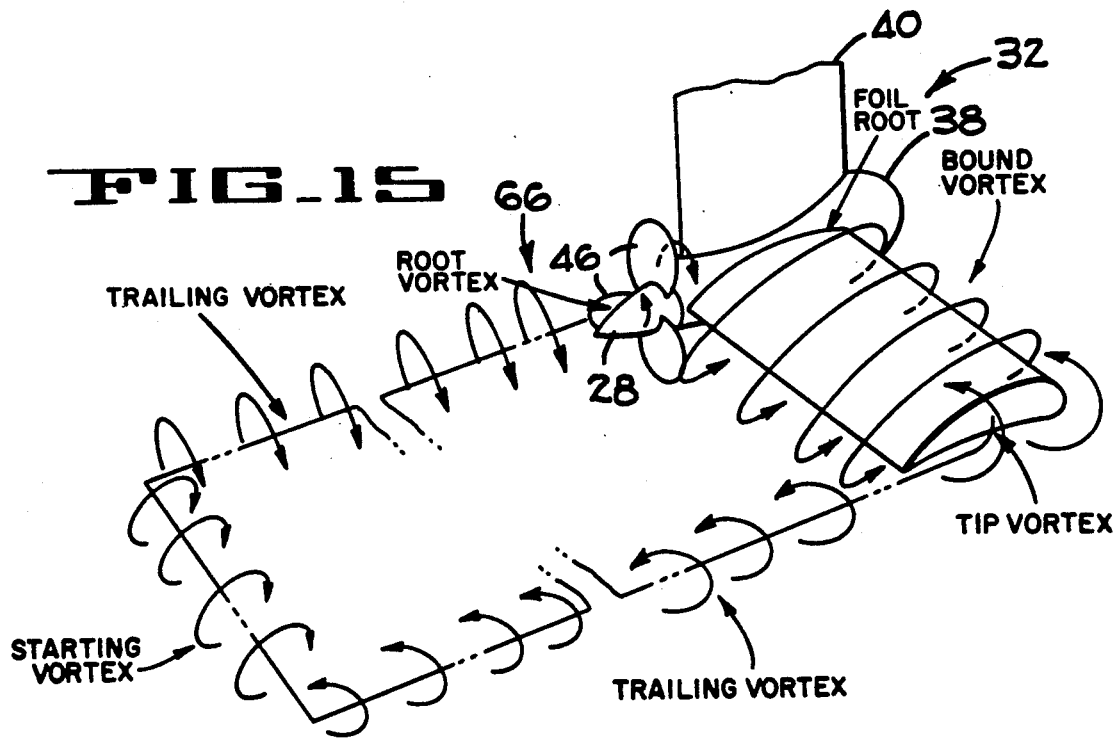
FIG_15

5,134,954

ASYMMETRIC HYDROFOIL PROPULSION METHOD AND APPARATUS

This application is a continuation of U.S. Pat. application Ser. No. 421,485, filed Oct. 13, 1989, now abandoned.

The present invention is an improvement to the following United States applications:

1. Duffty et al U.S. Pat. application Ser. No. 07/369,173 filed on Jun. 21, 1989 and entitled Amphibious Hydrofoil System now U.S. Pat. No. 5,027,737 which is issued on Jul. 2, 1991.

2. Duffty et al U.S. Pat. application Ser. No. 07/369,172 filed on Jun. 21, 1989 and entitled Integrated Propulsion and Hydrofoil System, now U.S. Pat. No. 4,974,539 which issued on Dec. 4, 1990.

3. Rodler U.S. Pat. application Ser. No. 07/369,179 filed on Jun. 21, 1989. and entitled Water Jet Propulsion Module, now U.S. Pat. No. 4,993,977 which issued on Feb. 19, 1991.

4. Duffty et al U.S. Pat. application Ser. No. 07/369,178 filed on Jun. 21, 1989 and entitled Improved Water Supporting and Propulsion System, now U. S. Pat. No. 4,953,492 which issued on Sep. 4, 1990.

BACKGROUND OF THE INVENTION

1. Field of the Invention

The present invention relates to water supported vehicles, and more particularly relates to improved propulsion and lifting means for asymmetric hydrofoil propulsion method and apparatus for propelling the vehicle more efficiently and at higher speeds.

2. Description of the Prior Art

Assignee's U.S. Samuel Pat. No. 3,420,204 discloses a water jet reactive propulsion system which is capable of propelling a tracked amphibious vehicle through water at slow speeds of about ten miles per hour.

SUMMARY OF THE INVENTION

In accordance with the present invention a watercraft, such as an amphibious vehicle or boat, is partially supported by a pair of asymmetric hydrofoil assemblies. Each hydrofoil assembly is generally L-shaped and including a motor and propeller connected to one end of an associated hydrofoil and to one end of a mounting leg having its other end connected to the watercraft at a location spaced from the other hydrofoil assembly thus defining the asymmetric hydrofoils. A driven propeller is located in alignment with an angle joint between a supporting leg and the associated hydrofoil, and is driven in a direction wherein upwardly moving blades of a propeller intercept a downwardly moving water wake of the vehicle and also water downwash flowing past the trailing edges of the associated asymmetric hydrofoils. The downward flow into the propeller provides substantially greater propulsion forces and lift which when contacted by the upwardly moving blades provides a considerable increased speed of the watercraft.

DESCRIPTION OF THE DRAWINGS

FIG. 1 is a perspective of a watercraft in the form of an amphibious vehicle in its water mode illustrating the propeller blades of two asymmetrical hydrofoil propulsion devices of the present invention.

FIG. 2 is a perspective of a watercraft in the form of a speedboat in its water mode illustrating tip vorticies and propeller blade vorticies.

FIG. 3 is a diagrammatic rear elevation of the amphibious vehicle of FIG. 1 illustrating the direction of rotation of the propellers.

FIG. 4 is a rear elevation of a portion of the speedboat of FIG. 2 diagrammatically illustrating the direction of movement of the propeller and the direction of movement of the downwash water into the propeller blades.

FIG. 5 is a top view of FIG. 4 diagrammatically illustrating the tip and blade vorticies.

FIG. 6 is a partial diagrammatic and vector diagram of an upwardly moving propeller blade which diagrammatically illustrates the summation of propeller blade speeds due to rotational and ahead speeds FIG. 7 is a vector diagram illustrating the thrust and torque which are components of the blade force.

FIG. 8 is a vector diagram illustrating downwash onto the propeller which improves efficiency.

FIG. 9 is a prior art sketch diagrammatically illustrating the wake fraction of a conventional ship which increases thrust.

FIG. 10 is a prior art sketch diagrammatically illustrating the stern of a conventional ship indicating that a propeller directly behind a ship causes increased flow speed which increases drag of the hull thus reducing useful thrust of the propeller.

FIG. 11 diagrammatically illustrates a hydrofoil and a propeller of the present invention indicating that the propeller increases the speed of flow over the hydrofoil which increases the lift and efficiency of the hydrofoil.

FIG. 12 is a diagram illustrating the flow of water past one of the hydrofoils.

FIG. 13 is a diagrammatic illustration of one of the asymmetric hydrofoil assemblies illustrating only one hydrofoil adjacent a propeller which provides the improved results of the present invention.

FIG. 14 is a diagrammatic perspective illustrating a plurality of flow control fins on the mounting leg and another flow control fin on the tubular motor housing of one of the asymmetric hydrofoil assemblies.

FIG. 15 is a perspective of the water flow pattern over one of the hydrofoil assemblies illustrating a complete lifting vortex system.

DESCRIPTION OF THE PREFERRED EMBODIMENT

The asymmetric hydrofoil apparatus of the present invention is illustrated as propelling watercrafts 20 which includes an amphibious hydrofoil vehicle 22 (FIGS. 1 and 3); and a speedboat 24 illustrated in FIGS. 2, 4 and 5.

The amphibious hydrofoil vehicle 22 is the same as that fully disclosed in cross-referenced Duffty et al, now U.S. Duffty et al U.S. Pat. No. 5,027,737 which issued on Jul. 2, 1991 except for substituting motors 26 connected to propellers 28 by shafts 30 (FIG. 6) in place of Duffty's water jet propulsion modules. Accordingly, the specific details of the amphibious hydrofoil vehicle will not be described in detail.

Likewise, the speed boat 24 (FIG. 2) is the same as that disclosed in Duffty et al U.S. Pat. application Ser. No. 07/369,172, now U.S. Pat. No. 4,953,492 and differs only in that the motors 26a driving propellers 28a have been substituted for the motors and jet propulsion modules disclosed in the Duffty et al U.S. Pat. application Ser. No. 07/369,178 now U.S. Pat. No. 4,953,492 which issued on Sep. 4, 1990. Reference may be had to the above cross-referenced Duffty et al U.S. Pat. No. 5,027,737 more specific details of the structure for raising and lowering the hydrofoils of the watercraft are desired.

Having reference to FIGS. 1 and 3, it will be noted that a pair of asymmetric hydrofoil assemblies 32 are each pivotally mounted to the amphibious vehicle 22 by a motor 34 which moves the hydrofoil assemblies between their operative position shown in solid lines in FIGS. 1 and 3, and their inoperative or stowed positions out of the water as shown in phantom lines in FIG. 3.

Each hydrofoil assembly 32 includes an asymmetric hydrofoil 36 having a wing shaped contour as best illustrated in FIGS. 1, 11 and 12 which when moved forwardly through water provides a higher pressure to the lower wing surface than to the upper surface of the hydrofoil 36 thus resulting in the lift that raises the vehicle in the water thereby minimizing drag and permitting movement of the vehicle at high speeds when in its water mode.

It will be noted that in addition to the hydrofoils 36, each hydrofoil assembly 32 includes a tubular housing 38 and a mounting leg 40. The mounting leg extends upright at an angle which supports the associated hydrofoil 36 in a horizontal or slightly upwardly and outwardly inclined position when in the water mode. Each hydrofoil may also include a movable water controlling device 41 (FIG. 1) which may be flaps for increasing lift at slow speeds; or may be ailerons for assisting the watercraft in high speed turns It will be appreciated that the asymmetry of the hydrofoils is due to the gap between the right and left hydrofoils, which gap as illustrated in FIGS. 1, 2 and 3 is in excess of the width of the watercraft upon which the hydrofoils are mounted. Stated in another way, the motor 26 and propeller 28 are not disposed at the midpoint between two hydrofoils. Accordingly, the downflow of water is as illustrated in FIG. 15 which illustrates the complete lifting vortex system of the right asymmetric hydrofoil.

As illustrated in FIGS. 1 and 3, the left-handed or port and right-handed or starboard propellers 28 are driven in the directions of the arrows which move the propellers counterclockwise (right-handed), and clockwise (left-handed), respectively, as viewed from the rear of the watercraft. Each propeller is illustrated as having three blades 46 (although other numbers of blades may be used) with the outer blades moving upwardly as best shown in FIGS. 1 and 2.

In operation, when the propellers 28 are driven in a direction moving the outboard propeller blades inwardly and upwardly which moves the vehicle forwardly, the hydrofoils 36 create a downwash of water at their trailing edges (FIGS. 12 and 15), and a rotating vortex or wake of the vehicle at the sides of the amphibious vehicle 22 (FIG. 3), and the sides of the speed boat 24 (FIG. 4), due to a differential of pressure on the top and bottom of the hydrofoils. Thus, the upper blades of both propellers move inwardly. The inboard blades which are not behind the foil, which is a component of the asymmetry, move downwardly. The lower blades move out which is termed an "inboard turning prop", and refers to the direction of movement of the upper blade tips. The conventional practice is outboard turning.

Alternatively, the asymmetry of flow around the foil caused by some combination of foil shaping and inclination angle to the flow creates a circulation flow around the foil sufficient to cause the flow on top and on the bottom of the foil to meet at a streamline. This is termed "satisfying the Kutta condition" (FIG. 12) and is required by physical law. This circulation is a flow in the direction of flow due to the forward motion of the foil above the top and opposed to it along the bottom. The summation of the circulation flow and the flow due to motion creates a speed differential on the top and bottom. This results in a pressure differential providing a source of lift. This pressure differential at the root and tip of the foil create a vortex due to flow of the fluid to try to equalize this pressure. It will be recognized that this vortex can also be considered to derive from the vorticity of the circulation flow (termed the "bound vortex") extending into the fluid (termed the "trailing vortex") back to the point that lift began with a "starting vortex" of equal and opposite sign. This condition is required by the physical law that requires a vortex not terminate in space.

Movement of the hydrofoils through the water creates a venturi effect on the top of the hydrofoil which creates a low pressure, while the planing action on the lower surface provides a high pressure These two pressures provide a source of lift. The downwash at the trailing edge of the hydrofoil and the differential pressure above and below the hydrofoils causes a vortex around the root and tip of each hydrofoil 36 as best illustrated in FIG. 1. The tip vortexes are indicated by arrows 48 (FIGS. 1 and 3) and try to eliminate the pressure differential between the upper and lower surfaces of the hydrofoil 36.

It will be recognized that each propeller blade 46 (FIG. 6) is also a hydrofoil in that it moves through the water at the speed of the watercraft 20 plus the radius of the blade 28 multiplied by the rate of revolution of the blade. The speed of the watercraft is directed aft, and the blade speed due to revolution is directed across the shaft 30 (FIG. 1). The rotational action of the propeller also produces vorticity and other effects such that the stream of fluid from the propeller (the propwash) contains rotational energy that is lost to the vehicle, resulting in reduced efficiency.

As diagrammatically illustrated in FIG. 7, the blade speed of the propellers 28 provide lift which is perpendicular to the speed of the propellers through the water. A relatively small blade drag is opposed to the blade speed. The lift and drag vectors add to the net force acting on the propeller blades. The component of the force along the shaft is thrust, and the component across the shaft is torque, both of which are blade forces.

As diagrammatically illustrated in FIGS. 1, 3, 4 and 15, the flow of water into each propeller 28 or 28a (FIG. 4) is in a direction opposite to the propeller rotation, which in the present case is somewhat downwardly into the upwardly moving propeller blades 46. Due to the use of asymmetric arrangement, i.e., a hydrofoil on one side of the propeller centerline, the vector sum of boat speed plus blade rotation is directed across the blade which can be viewed as an increase in the speed of the propeller.

When the flow into the propeller is directed into the propeller blades 46 in a direction opposite to the propeller rotation, as in the present invention, the vector sum of boat speed plus blade rotation is directed more normal to the blades 46 which in effect acts as an increase in the propeller speed. The result is that a lift net force vector, which is the sum of the lift and drag (FIG. 8) is directed more along the shaft centerline and less across the centerline. Accordingly, the propeller 28 is more efficient, with the source of efficiency being attributed to the reduction of the blade vortex thereby reducing drag. Thus, due to the change in the angle between the "flow without downwash" vector and the "effective blade flow" (FIG. 8) more thrust and less torque is provided.

Other interactions affects involve wake fraction and thrust deduction as illustrated in FIGS. 9 and 10.

In this regard, drag is produced by a watercraft, illustrated as a conventional ship 52 (FIG. 9) which drags an amount of water along with the ship, known as wake 50. Since the water in the wake has already been accelerated to ship speed, a propeller 54 (FIG. 10) only needs to accelerate the wake water to a portion of the speed of a propwash to get thrust which represents a gain in efficiency.

The wake 50 behind (FIG. 9) a conventional ship 52 is handled as if the propeller 54 was advancing through water (called the "speed of advance") at a lower speed than the boat speed The speed of advance is 1 minus Wt multiplied by the boat speed, and Wt is the "wake fraction" (FIG. 9) or percent the water is slowed. The efficiency gain due to these effects can be readily determined since the power into the propeller is its efficiency multiplied by the thrust it produces multiplied by the speed of advance. The power into the boat is thrust multiplied by the speed of the boat. When the boat speed is higher than the speed of advance there is a gain.

However, the above mentioned gain is not free. The action of the propeller 54 (FIGS. 9 and 10) produces a suction on the back of the ship 52 due to the increased speed of flow which increases the drag of the hull and reduces the useful thrust of the propeller 54 as illustrated in FIG. 10. This reduction of thrust is called "thrust deduction". The net thrust the propeller produces on the hull is 1 −t multiplied by the thrust the propeller would produce without the hull, with t being the thrust deduction factor. In the prior art practice, these two effects, drag and gain, usually cancel each other out as illustrated in FIG. 10.

FIGS. 2, 4 and 5 illustrate the watercraft 20 as a speed boat 24 having a pair of asymmetric hydrofoil assemblies 32a pivotally mounted on the speedboat near the stern thereof. It will be understood, however, that the hydrofoils may be permanently fixed as illustrated in FIG. 2 on the vehicle.

Since the asymmetric hydrofoil assemblies 32a are similar to that of the first embodiment of the invention, components of the second embodiment will be assigned the same numerals given to the first embodiment followed by the letter "a".

The asymmetric hydrofoils 36a are illustrated in operative position within the water, but may be pivoted above the boat 24 in a stowed position similar to that illustrated in phantom lines in FIG. 3. Water controlling devices 60 (FIGS. 2, 4 and 5) such as flaps or ailerons, may be provided for providing initial lift at slow speeds, or for banking the boat at high speeds respectively.

Tests of the subject invention have been conducted in ocean waters using a half scale model of an amphibious vehicle of the type illustrated in FIG. 1 having a weight of 4 tons. The vehicle was observed to attain thirty-four miles per hour with propellers of 20 inch pitch rotating at 1200 RPM. Such propeller would advance through an unyielding medium 20 inches per revolution resulting in a maximum theoretical speed ("propeller speed") for this condition of 33.3 feet per second. Thirty-four miles per hour is 50 feet per second. The "apparent slip" or difference between boat speed and theoretical propeller speed divided by propeller speed is negative fifty percent Conventional boats in this speed range normally have values of slip of about positive five to ten percent. The thrust requirement to attain these speeds for such a vehicle is about 800 pounds per propeller. In free water at thirty-four miles per hour the subject propeller produces 800 pounds of thrust at 1735 RPM. It is clear that the interaction effect produces an effective increase in propeller RPM.

Approximate calculations show that downwashes associated with this value of RPM increase would be sufficient to produce about 5000 pounds of lift. Since the total weight of the vehicle was 8000 pounds, and some portion was supported by planing forces on the hull bottom and buoyancy, this suggests that the above explanation of this effect is correct.

FIG. 13 illustrates the right or starboard asymmetric hydrofoil assembly 32 having only one asymmetric hydrofoil 36. If a second hydrofoil of equal size was added to the left side of the tubular motor housing 38, the resulting hydrofoil would be symmetrical, not an asymmetric hydrofoil.

FIG. 14 illustrates the port asymmetrical hydrofoil assembly 32, its mounting leg 40, its tubular motor housing 38, which houses a motor (not shown) that drives the propeller 28 in the direction of the arrow. A plurality of flow control fins 64 (only two being shown) are illustrated as being mounted on the mounting leg 40 and the motor housing 38. The fins are provided to minimize turbulent flow and guide the water into the blades of the propeller.

FIG. 15 diagrammatically illustrates a complete lifting vortex system 66 acting on the starboard hydrofoil assembly 32 illustrating the several vortexes resulting from the system when propelled through the water.

From the foregoing description it is apparent that the asymmetric hydrofoil propulsion method and apparatus provides more lift and higher speeds to a watercraft by partially supporting the watercraft by asymmetric hydrofoils driven by propulsors such as propellers which include blades that move upwardly into the downwash of water flowing over the trailing edges of the asymmetrically arranged hydrofoil or foils.

Although the best mode contemplated for carrying out the present invention has been herein shown and described, it will be apparent that modification and variation may be made without departing from what is regarded to be the subject matter of the invention.

What is claimed is:

1. An apparatus for improving the efficiency and speed of a watercraft when being propelled through water, comprising:
   means for partially supporting opposite sides of said watercraft with single substantially horizontal asymmetric hydrofoils connected to opposite sidewalls of said watercraft by upstanding legs with a fixed angle joint between said supporting legs and the associated hydrofoils, said hydrofoils having trailing edges which create downwashes of water over the trailing edges when propelled through water;
   means defining a pair of power driven propulsors;

means for supporting one of said pair of power driven propulsors on said watercraft at an inner end of each associated hydrofoil, which power driven propulsors each drive propeller blades which are disposed rearwardly of said trailing edges of their associated asymmetric hydrofoils and which propeller blades are positioned to move upwardly into the downwash from said asymmetric hydrofoils and also move upwardly to intercept a downwardly moving water wake of said watercraft thereby improving the speed, lift and efficiency of the watercraft.

2. An apparatus for improving the efficiency and speed of a watercraft having a body with side walls which form a pair of upwardly and outwardly moving water wakes when being propelled through water, comprising:

means defining a pair of spaced asymmetric hydrofoils operatively connected to the watercraft for partially supporting the watercraft and each creating a downwash of water when moving through water, each asymmetric hydrofoil having an inner end closely adjacent an associated side wall and within said associated water wake and an outer end portion outwardly of said associated water wake; and means defining power driven propeller blades mounted on said inner ends of said hydrofoils and being driven in directions which move said propeller blades upwardly and outwardly into said downwash from said associated hydrofoils, while downwardly and inwardly moving propeller blades move through said upwardly and outwardly moving wake water thereby improving the speed, lift and efficiency of the watercraft.

3. A method for improving the efficiency and speed of a watercraft having a body with side walls which form a pair of upwardly and outwardly moving wakes when being propelled through water, comprising the steps of:

operatively connected a pair of asymmetric hydrofoils to said watercraft for partially supporting said watercraft when moving through water with each asymmetric hydrofoil creating a downwash of water when moving through water; each asymmetric hydrofoil having an inner end portion disposed closely adjacent to an associated side wall and within an associated wake and a second end portion disposed outwardly of said associated wake; and driving two groups of propeller blades mounted on complementary inner end portions of said hydrofoils in directions which move upwardly into an associated downwash from the associated asymmetric hydrofoil while said downwardly and inwardly moving propeller blades move through said upwardly and outwardly moving water wakes thereby improving the speed, lift and efficiency of the watercraft.

* * * * *